(12) United States Patent
Scanlan et al.

(10) Patent No.: US 9,737,045 B1
(45) Date of Patent: Aug. 22, 2017

(54) PET WASTE STATION AND TRAINING DEVICE

(71) Applicant: Equipt4 LLC, Potomac, MD (US)

(72) Inventors: Holly Scanlan, Potomac, MD (US); Russell J Schweizer, Crystal Lake, IL (US)

(73) Assignee: Equipt4 LLC, Potomac, MD (US)

( * ) Notice: Subject to any disclaimer, the term of this patent is extended or adjusted under 35 U.S.C. 154(b) by 80 days.

(21) Appl. No.: 14/659,202

(22) Filed: Mar. 16, 2015

Related U.S. Application Data (60) Provisional application No. 61/954,518, filed on Mar. 17, 2014.

(51) Int. Cl.
*A01K 1/10* (2006.01)
*A01K 1/01* (2006.01)
*A01K 1/015* (2006.01)

(52) U.S. Cl.
CPC .......... *A01K 1/011* (2013.01); *A01K 1/0157* (2013.01)

(58) Field of Classification Search
CPC ............................... A01K 1/011; A01K 1/0107
See application file for complete search history.

(56) References Cited

U.S. PATENT DOCUMENTS

| | | | |
|---|---|---|---|
| 3,603,290 A * | 9/1971 | O'Rork | A01K 15/02 119/162 |
| 3,890,931 A | 6/1975 | Saver | |
| 5,355,837 A | 10/1994 | Reyes | |
| 5,771,841 A * | 6/1998 | Boor | A01K 1/0107 119/452 |
| 6,041,737 A * | 3/2000 | Hennigan | A01K 1/0107 119/161 |
| 6,059,247 A | 5/2000 | Olivadoti | |
| 6,408,790 B1 * | 6/2002 | Maguire | A01K 1/0114 119/165 |
| 6,523,495 B1 | 2/2003 | Rydman | |
| 6,983,719 B2 * | 1/2006 | Armstrong | A01K 5/02 119/169 |
| 7,107,933 B2 * | 9/2006 | Mohr | A01K 1/0107 119/166 |
| 7,584,717 B2 * | 9/2009 | Skovron | A01K 1/0107 119/165 |
| 7,621,233 B2 | 11/2009 | Dukes et al. | |
| 8,061,300 B2 * | 11/2011 | McElroy, Jr. | A01K 1/0107 119/164 |

(Continued)

FOREIGN PATENT DOCUMENTS

WO WO/2008/089011 A 7/2008

*Primary Examiner* — Kristen C Hayes
(74) *Attorney, Agent, or Firm* — Law Office of Oliver Edwards LLC (57) ABSTRACT

A pet waste station with pet training features is disclosed. The waste station may include a turf surface and a urine collection funnel for channeling urine into disposable absorbing pads. The pads may be placed in a drawer beneath the funnel, allowing easy removal and replacement of the drawer. Odor control may include a compartment for deodorizers or other air fresheners. A sensor may be provided to activate one or more positive reinforcement rewards when the pet successfully urinates in the waste station, including dispensing of an edible treat and/or playing of an audio snippet, such as an owner's voice praising the pet.

22 Claims, 11 Drawing Sheets

(56) References Cited

U.S. PATENT DOCUMENTS

| | | | |
|---|---|---|---|
| 8,327,802 B2* | 12/2012 | Matsuo | A01K 1/0114 119/166 |
| 8,816,859 B2* | 8/2014 | Kong | G09B 19/0076 340/568.1 |
| 8,863,693 B2* | 10/2014 | Kennington | A01K 1/0114 119/161 |
| 8,887,667 B2* | 11/2014 | Maguire | A01K 1/0107 119/165 |
| 9,131,664 B2* | 9/2015 | Tanigawa | A01K 29/005 |
| 2005/0284392 A1 | 12/2005 | Hillman | |
| 2006/0037548 A1* | 2/2006 | Mohr | A01K 1/0107 119/166 |
| 2008/0072834 A1* | 3/2008 | Makem | A01K 1/0107 119/169 |
| 2009/0314223 A1 | 12/2009 | Yuu | |
| 2010/0050951 A1* | 3/2010 | Maguire | A01K 1/0107 119/165 |
| 2010/0064975 A1* | 3/2010 | McElroy, Jr. | A01K 1/0107 119/61.55 |
| 2010/0095896 A1 | 4/2010 | Van Wye | |
| 2012/0048211 A1 | 3/2012 | McElroy | |
| 2012/0318204 A1* | 12/2012 | Matsuo | A01K 1/0107 119/166 |
| 2013/0228133 A1 | 9/2013 | Kennington | |

\* cited by examiner

PET WASTE STATION AND TRAINING DEVICE

This application claims priority to provisional application No. 61/954,518, filed Mar. 17, 2014, the contents of which are hereby incorporated in their entirety.

BACKGROUND

Field of the Invention

The present invention relates to pet training in elimination habits and relates to providing increased sanitation and reduced odor while providing a pet an indoor location for its elimination needs. The present invention also relates to providing positive reinforcement to a pet when it practices good elimination habits in the absence of its owner.

Description of the Related Art

U.S. Pat. No. 8,336,494 to McElroy discloses a pet waste device whereby a pet must urinate on an absorbable sheet material atop electrical conductors. If liquid reaches the underlying electrical conductors, a circuit may cause a nearby treat-containing compartment to open, thereby providing the pet an edible treat as a reward for urinating in the right spot. However, the approach of McElroy has both use and manufacture shortcomings. First, there must be adequate space for the pet and the pet may eliminate anywhere upon the sheet; accordingly, the sheet must therefore be large in relation to the pet. Second, consequently, the electrical conductor array, preferably stainless steel, must be manufactured to be as large as the sheet so that a rewardable urination event is not missed. Third, the approach of McElroy limits the number of events that may be rewarded to the number of compartments of the treat container. Fourth, as a pet uses the sheet, its urine may pool and flow to its feet prior to being absorbed by the sheet, creating an unhygienic situation for the pet and unpleasant tracking of urine outside the device. Fifth, cleanup of the McElroy device requires either direct handling of the saturated sheet or a saturated roll of sheet material. Finally, many pets may balk at eliminating on paper and are more comfortable with a feel of turf underfoot.

U.S. Pat. No. 7,621,233 to Dukes et al. discloses a urine sensing grid set atop a tray whereby a pet's urination on the grid is detected and a notification is sent to the pet's owner to empty the tray. As with McElroy, the Dukes device is complicated to manufacture, requiring a plurality of electrodes at each grid aperture.

Accordingly, there is a need to overcome the shortcomings of prior devices to further advance caring for and training pets in a dedicated limited spaces including, for example, small homes, apartments, condos, townhomes, dorm rooms and other limited indoor areas.

SUMMARY OF INVENTION

In an exemplary embodiment of the present invention, there is provided a pet waste station comprising a turf surface disposed above a funnel structure disposed above a replaceable absorbent pad within a removable drawer. The waste station may also include a section in which odor absorbing or deodorizing materials may be disposed. The waste station may include rubberized feet to prevent slippage of the pet waste station. The waste station may include a reward incentive unit for rewarding and incentivizing a pet's usage of the waste station. In such embodiments, a sensor is disposed to detect a urination event and to dispense a pet treat. In other embodiments, a recording of the pet owner's voice may provide personalized praise to the pet. In some embodiments, the sensor is an infrared sensor. In some embodiments, the sensor may include moisture conduction elements configured to increase conductivity when in contact with urine.

In some embodiments, a sensor may detect the absence of the drawer and prevent activation of the reward incentive unit. In some embodiments, the turf surface is supported by a rigidized grid which is disposed on the funnel and further supported by pylons thereon. In some embodiments, the turf surface may comprise coil mat. In some embodiments, the reward incentive unit has a lower-power mode which is entered upon absence of a pet for some pre-determined amount of time, as detected by a pet sensing device. The reward incentive unit may be mechanically and electrically attached to the pet waste station via a base connector affixed to a frame of the pet waste station.

In some embodiments, the reward incentive unit utilizes an elevator mechanism to dispense the treat. In other embodiments, the reward incentive unit utilizes a gravity feed mechanism modulated by motor- or servo-controlled doors, augers, constrictors, push-pins, flippers, rotatable chambers, vibration cams, and spring-loaded traction wheels. The reward incentive unit may be battery powered or utilize household current.

In some embodiments, the turf surface may be disposed upon a multiple beam funnel by which multiple channels between the beams channel urine into drain slots located above the drawer.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1A:
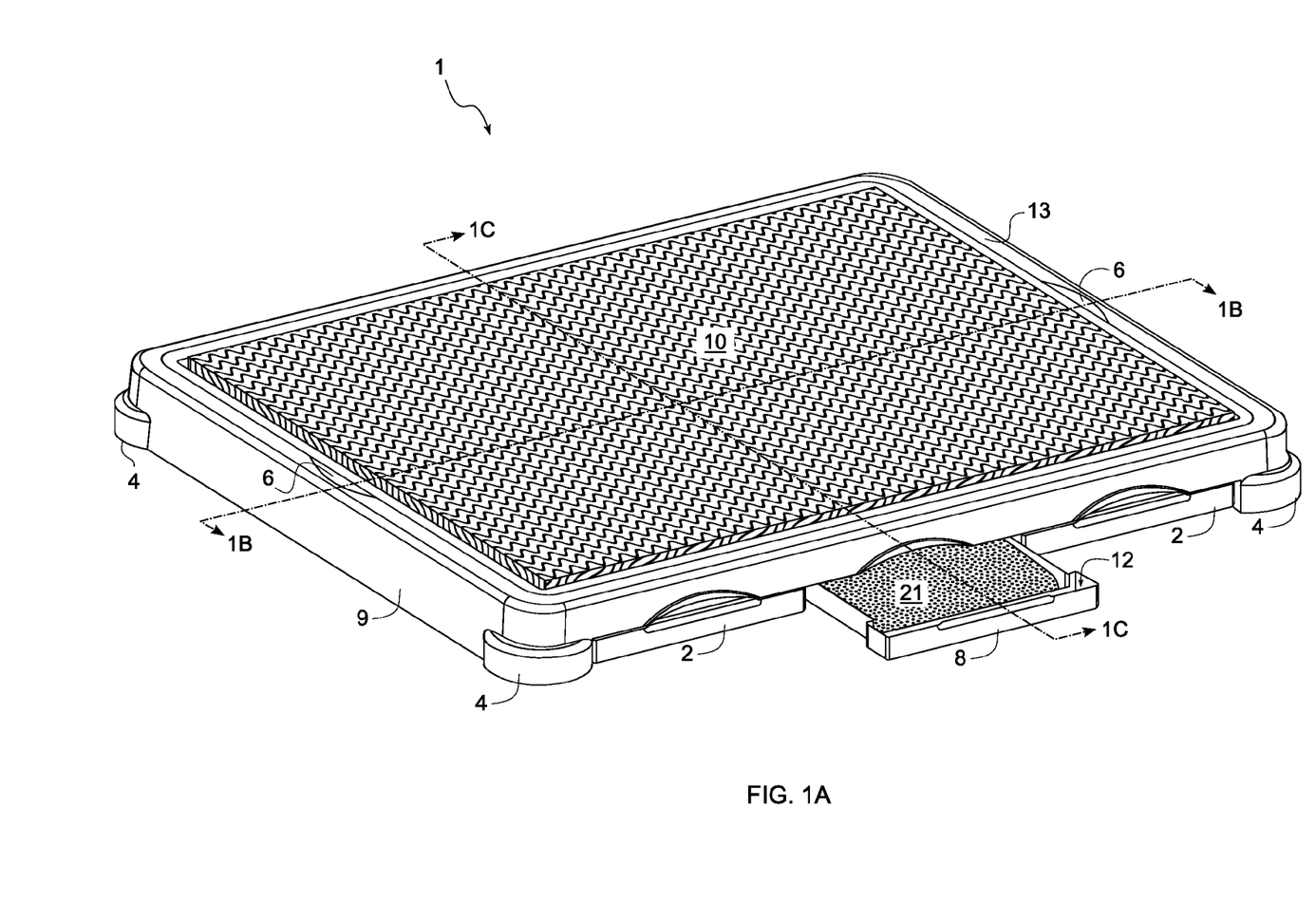
FIG. 1A is a perspective illustration of an exemplary embodiment of the present invention.
Figure 1B:
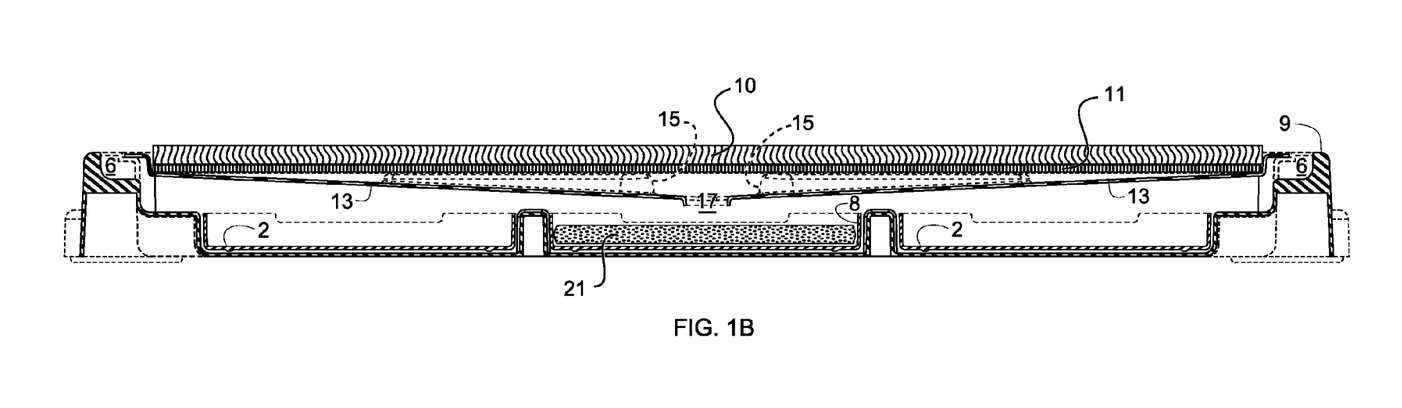
FIGS. 1B And 1C are cross-sectional illustrations of the embodiment of FIG. 1A taken along sectional lines 1B-1B and 1C-1C, respectively.
Figure 1C:
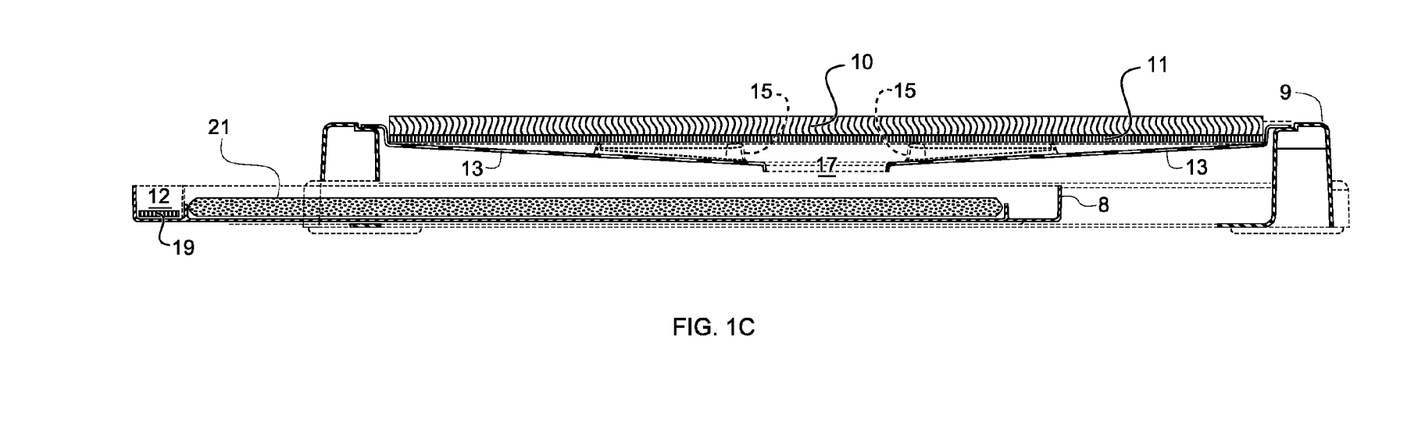

Referring to FIGS. 1A, 1B, and 1C, a perspective view and cross-sectional views, respectively, an exemplary embodiment of the present invention comprises a pet waste station 1 including a turf surface 10 disposed upon a frame 9. The frame 9 may include feet 4 having a non-skid floor-contacting material such as rubber to help waste station 1 stay put. Drawer 8 is illustrated partially drawn open.

Figures 1D, 1E, 1F, 2B, 9:
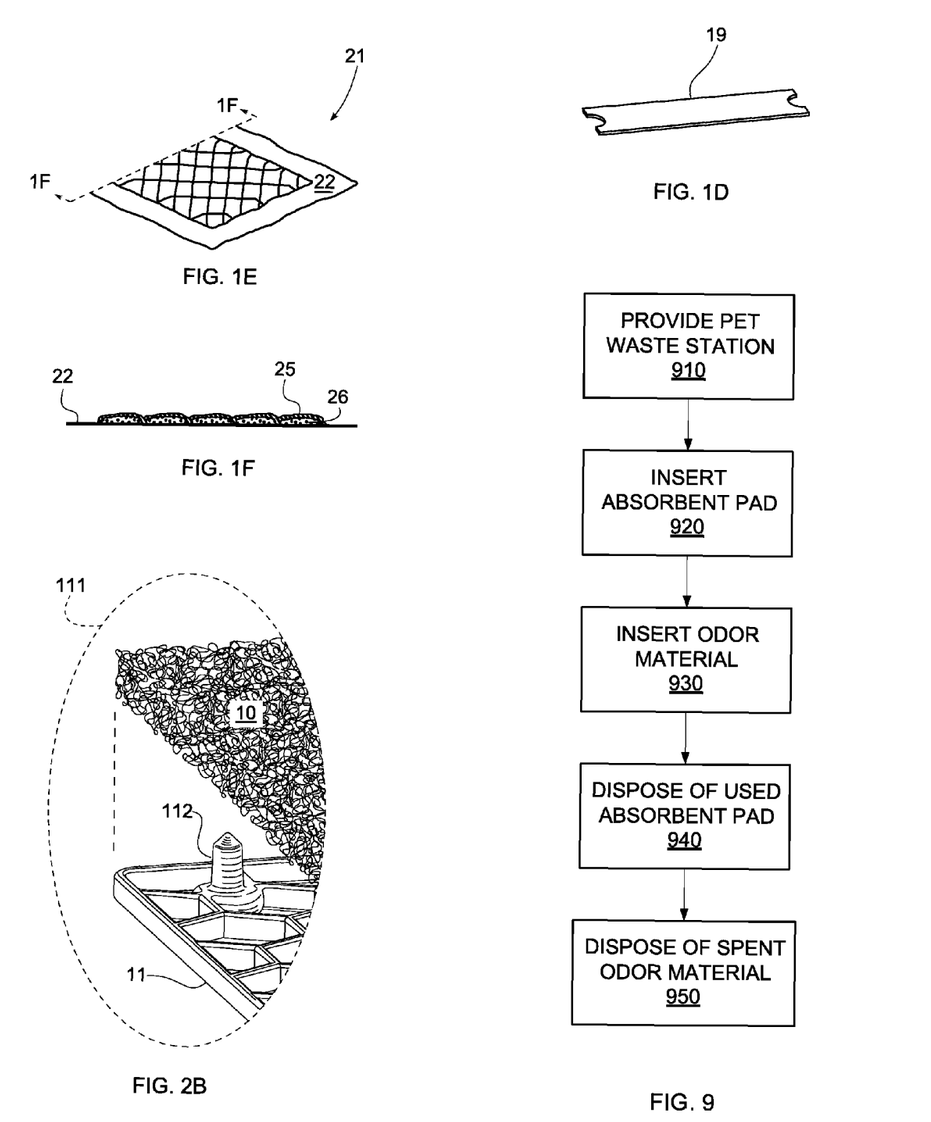
FIG. 1D illustrates an exemplary odor control material.
FIGS. 1E and 1F illustrate an exemplary absorbent pad in partial perspective and cross-sectional views, respectively.
FIGS. 2A and 2B are exploded perspective illustrations of an exemplary embodiment of the present invention.
FIG. 9 is a method of pet care in accordance with embodiments of the invention.
Figure 2A:
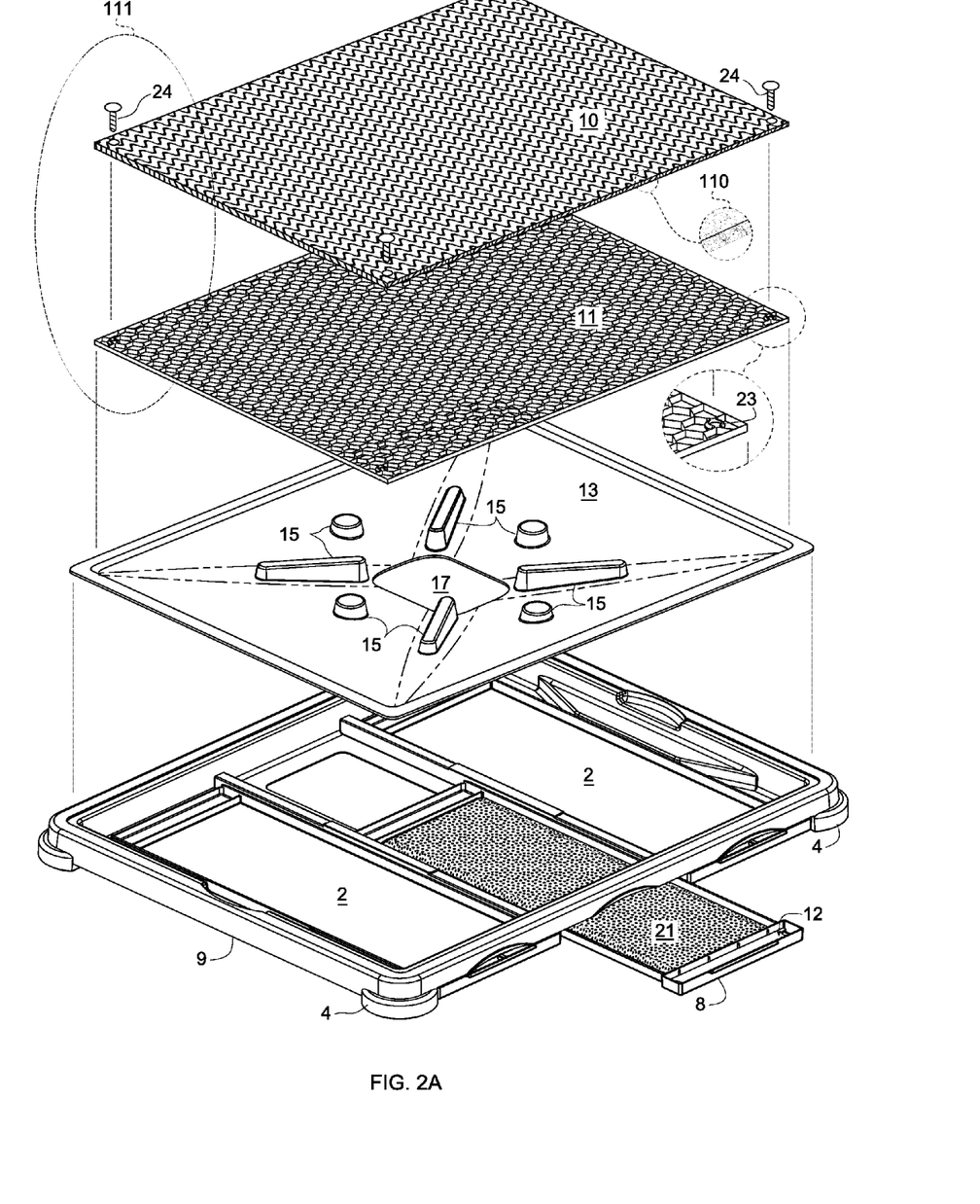

A pet may eliminate upon turf surface layer 10. Turf surface layer 10 is a liquid permeable non-absorbing layer through which urine may flow under the influence of gravity. Layer 10 may be an artificial turf mat such as a mat comprised of ASTROTURF brand artificial grass or, in one embodiment, a coil mat or filament loop mat (for this option, see detail 110 in FIG. 2A or mat 20 in FIG. 2B) comprised of non-absorbing materials, PVC or polyethylene, for example. With reference to FIGS. 2A and 2B, exploded perspective views of an exemplary embodiment of the present invention, layer 10 may disposed upon a flow-through support structure 11, such as a grid or grate. Optionally, layer 10 and grid 11 may be disconnectably connected to each other by way of fasteners such as screws 24 and hole 23, thereby preventing the turf layer from being easily dislodged by a pet jumping on or off waste station 1. In one embodiment illustrated in FIG. 2B, alternative detail 111, grid 11 may include two or more integral posts 112 (only one shown) extending above the main grid. Posts 112 may be positioned near each corners of grid 11. Mat 10 may be pushed down over posts 112 so the mat is seated on the grid 11 and engaged with posts 112.

The combination of turf layer 10 and grid 11 may be disposed upon funnel and support member 13. Funnel 13 is shaped so that there is a downward path on its floor from any point to opening 17, located at the lowest point of the floor. Funnel 13 may include one or more pylons 15 for supporting, respectively, grid 11, turf 10 and the pet (not shown). The surface of funnel 13 comprises a good hydro-coefficient material to route liquid most efficiently to opening 17. Funnel 13 may comprise polypropylene; however, in some embodiments, the surface may be manufactured to minimize inherent hydrophobic-like surface characteristics. Such means of surface treatment may comprise selective manufactured texture zones or post-manufactured surface treatments such as by plasma. The combination of turf 10, grid 11 and funnel 13 are disposed in frame 9 so that opening 17 is disposed over a drawer 8 in which an absorbent pad 21 may be disposed.

As a pet urinates on turf 10, urine flows through turf 10 and grid 11 and flows down the funnel floor to opening 17 and onto absorbent pad 21 in drawer 8. Once absorbent pad 21 is saturated, the pet care giver may withdraw drawer 8, carry it to a waste receptacle, and turn out waste pad 21 into the waste receptacle without the care giver needing to touch or otherwise directly handle pad 21. The care giver may then drop a new pad 21 into drawer 8 and replace drawer 8 in frame 9 so that it is once again disposed beneath opening 17. In a preferred embodiment, drawers 2 may be used to store replacement pads 21 and other supplies (not illustrated). Drawers 2 are illustrated in their closed positions.

With reference to FIGS. 1E and 1F, in some embodiments, pad 21 comprises super absorbent polymer or cellulosic material 26 to absorb urine. Such material 26 may convert liquid into gel to lock in moisture. Pad 21 may further comprise a nonwoven porous fabric envelope 25 for encapsulating material 26, and nonporous lining 22 on one side. Lining 22 may be dimensioned wider than envelope 25 so that when it is placed in drawer 8, the pad compartment side walls and the floor are lined by lining 22. Envelope 25 may be emboss adhered to lining 22 in a periodic or quilting pattern for increasing structural integrity of pad 21 and facilitating uniform distribution of material 26. Pad 21 may also be a washable cloth insert. In the event that no pad is available, pet waste station 1 may still be used; drawer 8 can collect urine in the absence of a pad and once collected, the contents of drawer 8 may be emptied into a toilet or disposed in another suitable manner.

Solid waste deposited on turf 10 may be removed by conventional means (e.g., a scoop or bagged hand) or the turf 10, grid 11 and funnel 13 assembly may be easily lifted from frame 9 in the area of lift gaps 6 by grasping funnel 13 from below its lip. The assembly may be carried to a location where solid waste is slid off into a waste receptacle. Additionally, turf 10, grid 11 and funnel 13 may be easily removed for cleaning in a similar manner.

In one embodiment, pet waste station 1 includes a compartment 12 for holding odor control material 19 for deodorizing or air freshening. Such material 19 may be adsorptive material such as zeolite or activated charcoal. Other suitable material 19 may include off-gassing material such as fragrance impregnated paper-board, see, for example, FIG. 1D, and gels. Once the effectiveness of material 19 has been exhausted, it may be removed from compartment 12, discarded and replaced from fresh supplies. In one embodiment, compartment 12 may be integral to drawer 8.

Figure 3A:
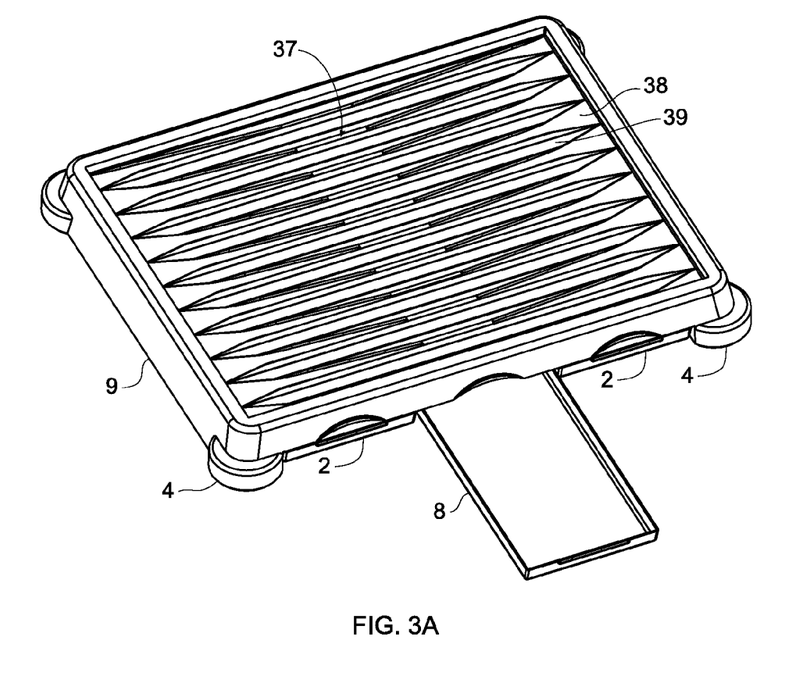
FIGS. 3A and 3B are perspective and plan views of an exemplary embodiment of the present invention.
Figure 3B:
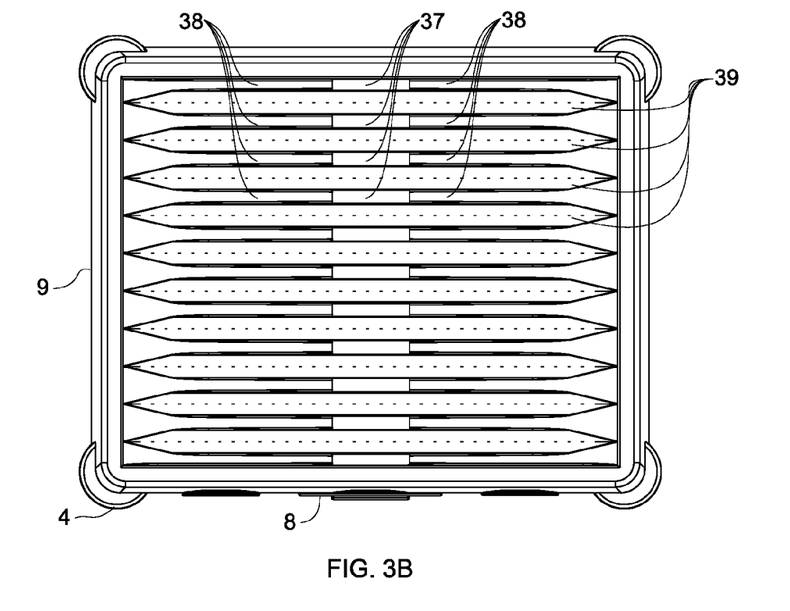

Referring to FIGS. 3A and 3B, perspective and plan views of a second exemplary embodiment of the present invention, a drain channel and beam structure is substituted for funnel 13. In this embodiment, turf 10 and optional grid 11, not shown here, would be disposed on a plurality of beams 39 (although there are ten illustrated, reference lines are shown only to four to avoid a cluttered drawing). Beams 39 may comprise a ridge or other peak so that urine does not accumulate on the top of beams 39. When a pet eliminates on the turf, urine would flow through turf 10 and into sloping channels 38 (although there are eleven illustrated, reference lines are shown only to four) which are sloped downward in the direction of openings 37 (although there are eleven illustrated, reference lines are shown only to four) so that urine flows down through channels 38 and through openings 37. Openings 37 are disposed above drawer 8, shown partially drawn open in FIG. 3A and closed in FIG. 3B. As with the embodiments of FIGS. 1A and 2A, an absorbent pad 21, not shown here, may be disposed in drawer 8 to absorb and contain urine. Optional drawers 2 may contain supplies.

Figure 4A:
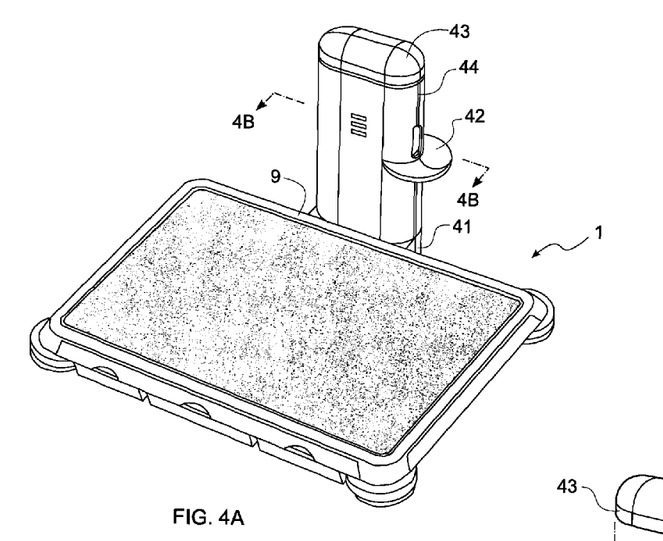
FIG. 4A is a perspective illustration of an exemplary embodiment of the present invention utilizing a gravity treat dispenser.

Referring now to FIG. 4A, an exemplary perspective illustration of an embodiment of the present invention, a gravity treat dispenser 44 may be included. When a pet urinates on pet waste station 1, the pet may be rewarded with a treat dispensed from treat dispenser 44 onto treat platform 42. Research shows that a pet will learn quicker if rewarded. As further illustrated in FIG. 4B, a partial sectional view of exemplary gravity treat dispenser 44, and FIG. 4C, an exploded perspective view of exemplary gravity treat dispenser 44, the dispenser 44 may include a bin 45 for holding a quantity of treats, not shown, covered by a cover 43. Cover 43 may include features allowing it to be secured or locked to dispenser 44 to prevent pet infiltration into the treat cache. Battery 50 is used to power control circuitry 46 and dispenser actuator 51. By virtue of gravity, treats in bin 45 flow down sloping bin floor 53 to chute 54. Actuator 51 may drive push bar 55 to dispense the treat from the chute through optional cover 49 and opening 47 onto platform 42.

Dispenser 44 may be detachable from base 41 which is attached to the frame 9 of pet waste station 1. Base 41 may include electrical and mechanical interfaces 52. In embodiments not shown, dispenser 44 may be remote from waste station 1, provided it remains in communication with the sensing apparatus of waste station 1, described below with reference to FIGS. 5A, 5B and 5C.

Figure 4B:
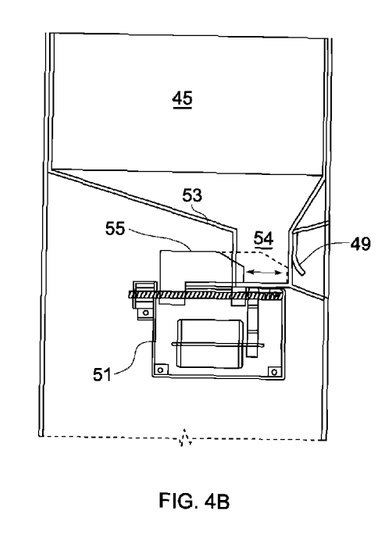
FIG. 4B is a partial sectional view of an exemplary gravity treat dispenser in accordance with embodiments of the present invention taken along sectional line 4B-4B of FIG. 4A.
Figure 4C:
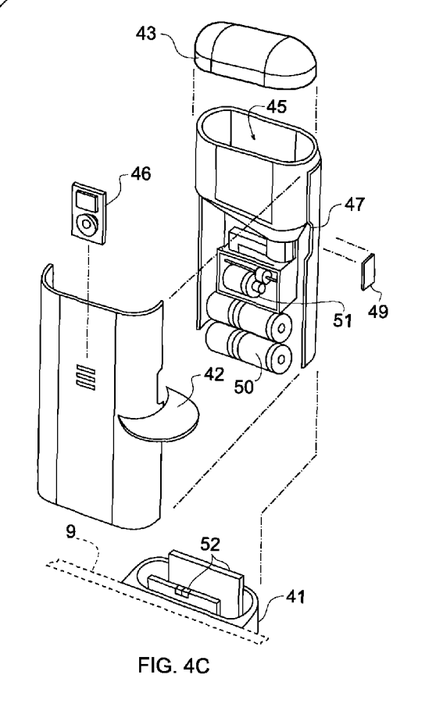
FIG. 4C is an exploded perspective view of an exemplary gravity treat dispenser in accordance with embodiments of the present invention.

In one embodiment, circuitry 46 may include a speaker whereby an audio snippet may be played to the pet upon successful use of waste station 1. Multiple such audio snippets may be stored and might include, for example, the owner's voice praising the pet by name. In one embodiment, circuitry 46 includes a microphone and controls allowing the owner to record the snippets.

Figure 5A:
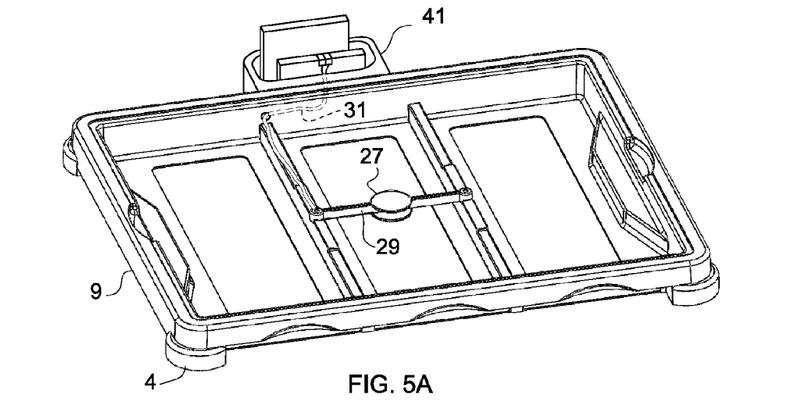
FIGS. 5A and 5B are perspective illustrations of aspects of an exemplary embodiment of the present invention utilizing a sensor.
Figure 5B:
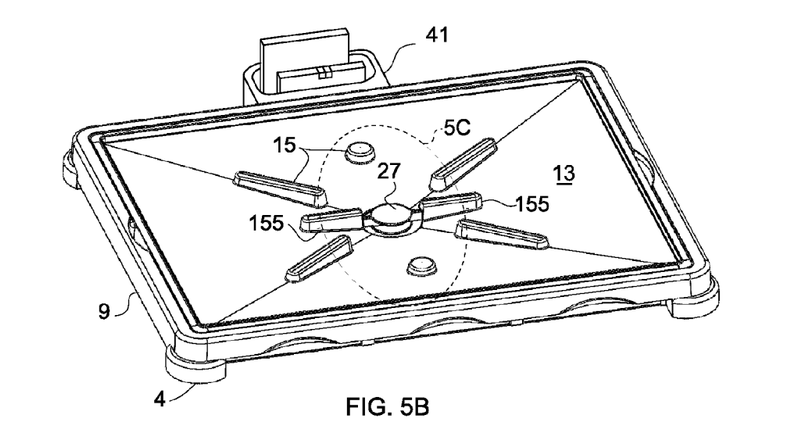
Figure 5C:
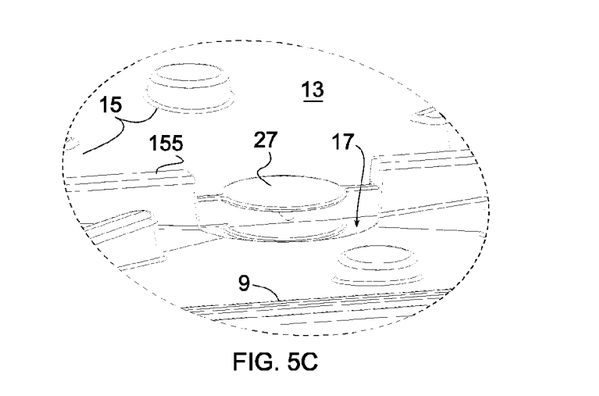
FIG. 5C is a detail perspective illustration of portion 5C of FIG. 5B.
Figure 6A:
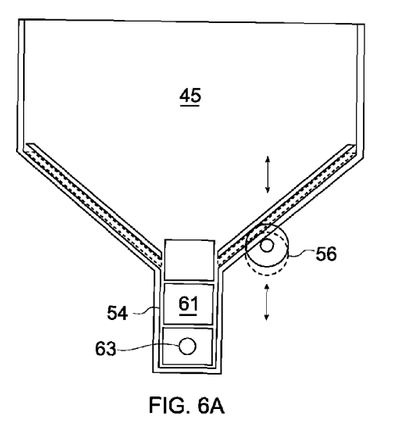
FIGS. 6A, 6B, 6C, 6D, 6E, 6F and 6G are partial sectional illustrations of exemplary gravity treat dispensers in accordance with embodiments of the present invention.
Figure 6B:
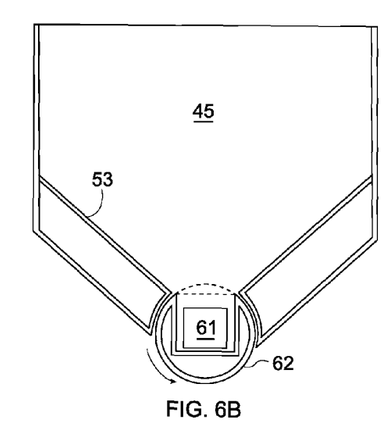
Figure 6C:
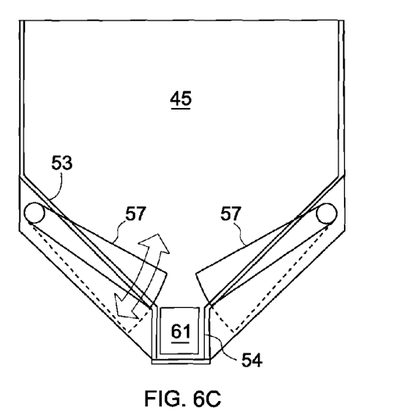
Figure 6D:
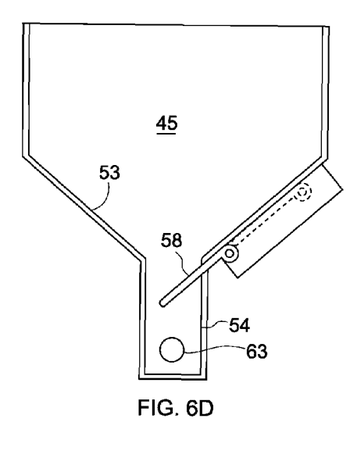
Figure 6E:
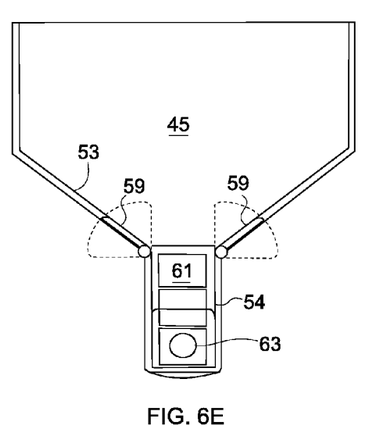
Figure 6F:
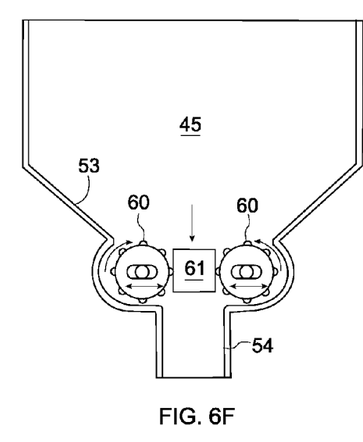
Figure 6G:
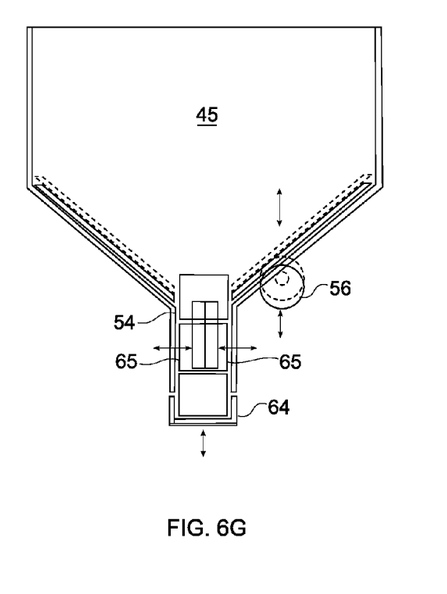

With reference to FIGS. 5A, 5B and 5C, perspective illustrations are provided of an exemplary sensor configuration in accordance with embodiments of the invention. In FIG. 5A, to simplify illustration, only prior components frame 9 and dispenser base 41 are shown. Attached to frame 9 is sensor 27 attached to beam 29. Interface wire 31 runs from the sensor 27 to dispenser base 41. In FIG. 5B, funnel 13 is nested onto frame 9. Funnel 13 includes pylons 15 and pylons 155. The funnel 13 is configured to cause urine to flow in close proximity to sensor 27 which is disposed at opening 17. Pylons 155 are configured to channel the flow to the active area(s) of sensor 27 and to provide space for beam 29 as shown in detail 5C of FIG. 5C.

In one embodiment, sensor 27 is a passive infrared detector configured to sense the heat of urine flowing nearby. In other embodiments, sensor 27 may include electrical leads which are open circuits in the absence of urine and conducting otherwise. The signal from sensor 27 is communicated to the circuitry 46 in dispenser 44 through wire 31 and interface connection 52.

With reference to FIGS. 6A through 6G, a number of alternative illustrative means for gravity feeder 44 are disclosed in cross sectional views of the bin 45, chute 54 and floor 53. In an embodiment illustrated in FIG. 6A, cam 56 vibrates the bin floor to cause treat 61 to move into chute 54. In an embodiment illustrated in FIG. 6B, rotation chamber 62 admits and dispenses one treat per rotation. In an embodiment illustrated in FIG. 6C, flippers 57 force treat 61 to move into chute 54. In an embodiment illustrated in FIG. 6D, a sliding door 58 modulates the flow of treats, not shown, into chute 54. In an embodiment illustrated in FIG. 6E, flipping panels 59 modulate the flow of treats 61 into chute 54. In an embodiment illustrated in FIG. 6F, spring-loaded traction wheels 60 modulate the flow of treats 61 into chute 54. In some of the foregoing embodiments, ejector pin 63 is used to facilitating ejecting treat 61 onto dispenser platform 42. In an embodiment illustrated in FIG. 6G, cam 56 vibrates the bin floor to cause treat 61 to move into chute 54; treats are modulated into elevator stage area 64 by constriction mechanism 65.

Figure 7A:
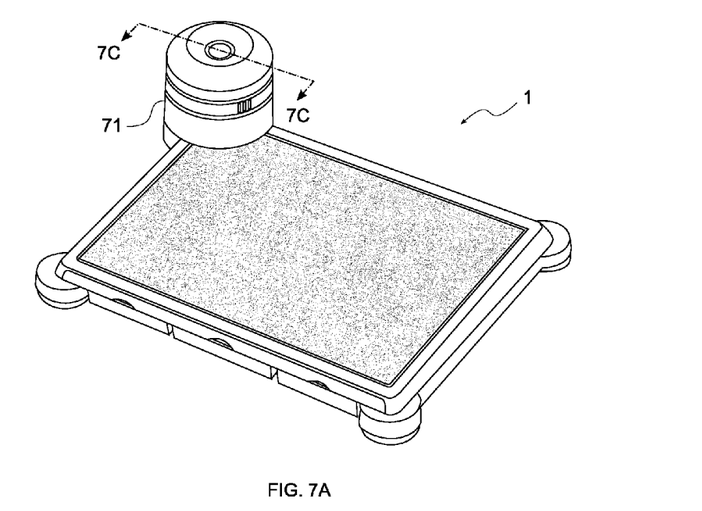
FIG. 7A is a perspective illustration of an exemplary embodiment of the present invention utilizing an elevator treat dispenser.
Figure 7B:
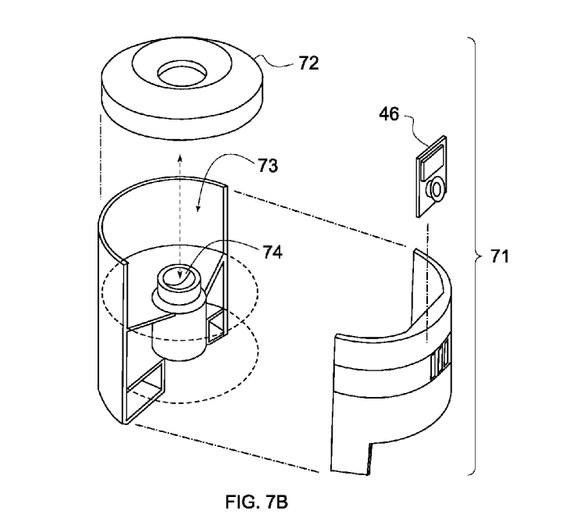
FIG. 7B is an exploded partial perspective view of an exemplary elevator treat dispenser in accordance with embodiments of the present invention.
Figure 7C:
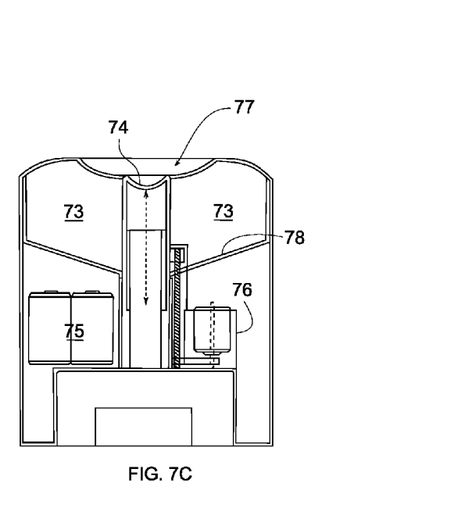
FIG. 7C is a partial sectional view of an exemplary elevator treat dispenser in accordance with embodiments of the present invention taken along sectional line 7C-7C of FIG. 7A.

Referring now to FIGS. 7A, 7B and 7C, some embodiments of the present invention may include an elevator treat dispenser 71. When a pet urinates on pet waste station 1, the pet may be rewarded with a treat dispensed from treat dispenser 71 onto treat platform 77. As further illustrated in FIG. 7C, a partial sectional view of exemplary elevator treat dispenser 71, and FIG. 7B, an exploded partial perspective view of exemplary elevator treat dispenser 71, the dispenser 71 may include a bin 73 for holding a quantity of treats, not shown, covered by a securable cover 72. Battery 75 is used to power control circuitry 46 and dispenser actuator 76. By virtue of gravity, treats in bin 73 will travel down sloping bin floor 78 to the base of elevator 74. When actuated, elevator 74 will lower into the bin and under the pile of treats. As the elevator 74 rises out of the pile of treats, the cup shape of elevator 74 will retain one treat. Finally, the treat arrives through the opening in cover 72 onto platform 77.

Figure 8A:
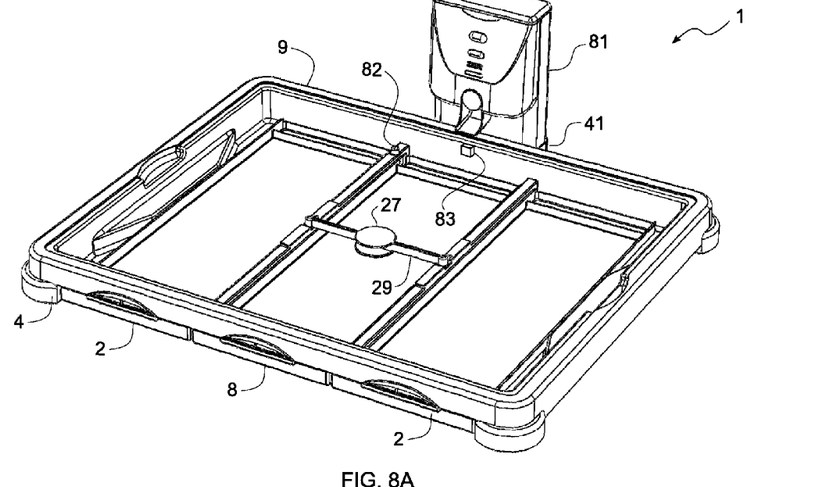
FIG. 8A is a perspective illustration of an aspect of an exemplary embodiment of the present invention utilizing a gravity auger treat dispenser.

Referring now to FIG. 8A, some embodiments of the present invention may include additional sensors. For example, drawer sensor 82 may be disposed and configured to sense when drawer 8 is not fully seated. In such a situation, the feeder circuit 46, such as that in gravity auger treat dispenser 81, is configured to disable feeding so as to prevent false dispensing by an inadvertent triggering of sensor 27. Sensor 82 may comprise a contact switch, magnetic switch, or other position sensor known to those in the art. Also, embodiments of pet waste station 1 may include pet sensor 83. Pet sensor 83 is disposed and configured to detect the presence of a pet on or near pet waste station 1. Feeder circuit 46 may be configured to go into a low-power "sleep" mode when no pet is detected by pet sensor 83. Pet sensor 83 may comprise a weight sensor, a mechanical movement or vibration detector such as an accelerometer, a passive infrared detector or other proximity detector known to those in the art.

Figure 8B:
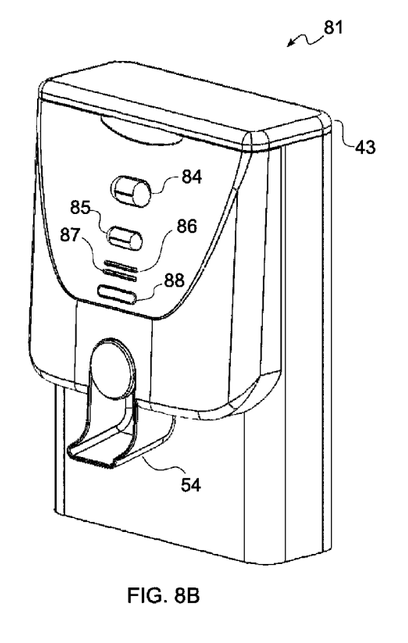
FIG. 8B is a perspective illustration of a detail of FIG. 8A.
Figure 8C:
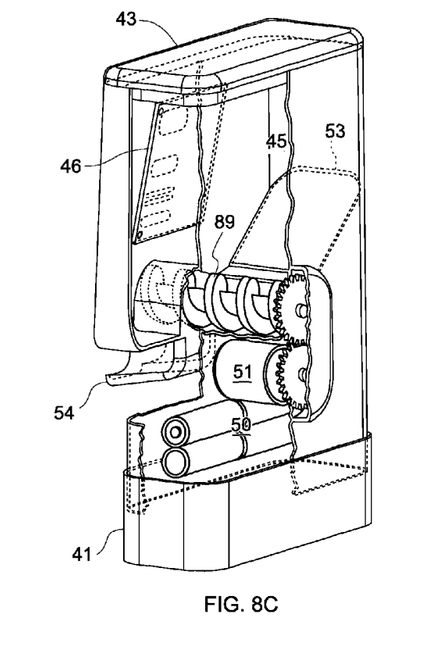
FIG. 8C is a reverse perspective partial cut away illustration of a detail of FIG. 8A.

As further illustrated in FIGS. 8B and 8C, a front perspective view and a rear perspective partial cut-away view of exemplary gravity auger treat dispenser 81, respectively, the dispenser 81 may include a bin 45 for holding a quantity of treats, not shown, covered by a securable cover 43. Battery 50 is used to power control circuitry 46 and dispenser actuator 51. By virtue of gravity, treats in bin 45 will travel down sloping bin floor 53 to auger 89. When actuated, auger 89 rotates to advance one or more treats into chute 54. In some embodiments, the end of chute 54 may include a lip (not illustrated) to prevent the treat from being deposited onto an undesired location. In some embodiments, some part of the outer wall of bin 45 may comprise transparent or translucent material permitting a pet owner to discern the quantity of treats in bin 45. As with the gravity dispenser 44, gravity auger dispenser 81 may be detachably attachable to the frame 9 of pet waste station 1, or alternatively, not shown, remote from pet waste station 1.

A feeder, such as feeder 81, may include a circuit 46 for controlling the feeder according to user control and sensor input. For example a feeder may include control input 84 for controlling a feed mechanism such as actuator 51 and auger 89. When control input 84 is actuated, the feed mechanism may be actuated in, for example, one-half turn increments, allowing the feeder to be "primed" such as when the bin 45 is initially loaded with treats. A feeder may also include a control input 85 for permitting control of the audio circuit, allowing, for example, a new recording to be made through microphone 86 or played back through speaker 87. A feeder may also include indicator portion 88. Indicator portion 88 may comprise one or more LEDs to indicate, among other things, power-on, low-power, low-battery, and dispensing.

While batteries 75 and 50 have been illustrated, the unit may also utilize power from an AC source.

With reference to FIG. 9, in accordance with other embodiments of the invention, there are provided certain methods for pet care. In such methods, there is a step 910 of providing a pet waste station, such as one described above, a step 920 of inserting an absorbent pad 21 into drawer 8, and an optional step 930 of inserting odor control material 19 into compartment 12. After the waste station has been used by a pet, there are steps 940 and 950 of disposing of saturated absorbent pad 21 and spent odor control material 19, respectively.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

What is claimed is:

1. An indoor pet waste station for sanitary pet elimination and habit reinforcement, said station comprising:
   a base frame configured with non-skid feet and a drawer, the drawer configured to removably hold a liquid absorbent pad;
   a compartment for removably holding an odor control component;
   a funnel and mat support structure disposed within said base frame such that an outlet of the funnel is disposed above the drawer;
   a non-absorbing liquid permeable mat disposed upon said funnel and mat support structure;
   a sensor disposed and configured to detect waste elimination activity by a pet upon the pet waste station; and
   a reinforcement apparatus coupled to said sensor, the reinforcement apparatus configured to present a reinforcement to a pet when waste elimination activity is detected.

2. The indoor pet waste station of claim 1, wherein the compartment is disposed in the drawer.

3. The indoor pet waste station of claim 1, wherein the reinforcement apparatus presents a reinforcement comprising an edible treat.

4. The indoor pet waste station of claim 1, wherein the reinforcement apparatus presents a reinforcement comprising an audible recording of a pet owner's voice.

5. The indoor pet waste station of claim 1, wherein the sensor is an infrared sensor disposed to detect warm liquid.

6. The indoor pet waste station of claim 1, wherein the sensor is disposed to detect a change in electrical conductivity indicating presence of liquid.

7. The indoor pet waste station of claim 1, wherein the permeable mat mimics grass.

8. The indoor pet waste station of claim 1, wherein the permeable mat comprises a loop coil mat.

9. The indoor pet waste station of claim 1, further comprising a sensor for detecting that the drawer is not seated and an alerter configured to alert a user that the drawer is not seated.

10. A pet waste station for sanitary pet waste elimination and odor control, said station comprising:
    a base frame configured with a drawer for removably holding a liquid absorbent pad;
    an absorbent pad disposed in said drawer;
    a funnel and mat support structure disposed within said base frame such that an outlet of the funnel is disposed above the drawer;
    a non-absorbing liquid permeable mat disposed upon said funnel and mat support structure; and
    a compartment for removably holding an odor control component.

11. The pet waste station of claim 10, wherein the mat is a coil loop mat.

12. The pet waste station of claim 10, further comprising at least one additional drawer disposed within the base frame for storing supplies.

13. The pet waste station of claim 10, further comprising an odor control component, said component configured to be disposed in the compartment.

14. The pet waste station of claim 13, wherein the odor control component is fragrance impregnated paper-board.

15. The pet waste station of claim 10, wherein the funnel and support structure comprises a weight distributing non-liquid collecting grid portion upon which the mat is disposed; further wherein the funnel includes a plurality of pylons thereupon for supporting the grid portion.

16. The pet waste station of claim 15 wherein the grid portion comprises two or more posts for removably engaging the mat to secure the mat to the grid portion.

17. A method for pet care comprising:
    providing a pet waste station in accordance with 10; and
    after the pet waste station has been used by a pet, removing the absorbent pad from the drawer.

18. The method for pet care of claim 17, further comprising:
    placing an odor control component into the compartment; and
    removing the odor control component when it is no longer effective.

19. The method for pet care of claim 18, wherein the odor control component is fragrance infused paper-board.

20. The method for pet care of claim 18, wherein the absorbent pad comprises a lining dimensioned to cover side walls and a floor of the drawer.

21. An indoor pet waste station for sanitary pet elimination and habit reinforcement, said station comprising:
    a base frame configured with non-skid feet and a drawer, the drawer configured to removably hold a liquid absorbent pad;
    a funnel and mat support structure disposed within said base frame such that an outlet of the funnel is disposed above the drawer;
    a non-absorbing liquid permeable loop coil mat disposed upon said funnel and mat support structure;
    a sensor disposed and configured to detect waste elimination activity by a pet upon the pet waste station; and
    a reinforcement apparatus coupled to said sensor, the reinforcement apparatus configured to present a reinforcement to a pet when waste elimination activity is detected.

22. The indoor pet waste station of claim 21, further comprising a compartment for removably holding an odor control component.

\* \* \* \* \*